US009442780B2

(12) United States Patent
Gruber

(10) Patent No.: US 9,442,780 B2
(45) Date of Patent: Sep. 13, 2016

(54) SYNCHRONIZATION OF SHADER OPERATION

(75) Inventor: Andrew Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 713 days.

(21) Appl. No.: 13/186,236

(22) Filed: Jul. 19, 2011

(65) Prior Publication Data

US 2013/0021360 A1 Jan. 24, 2013

(51) Int. Cl.
| | |
|---|---|
| *G06T 1/20* | (2006.01) |
| *G06F 9/54* | (2006.01) |
| *G06T 1/60* | (2006.01) |
| *G06T 15/00* | (2011.01) |
| *G06F 9/52* | (2006.01) |

(52) U.S. Cl.
CPC .................. *G06F 9/544* (2013.01); *G06F 9/52* (2013.01); *G06T 1/20* (2013.01); *G06T 1/60* (2013.01); *G06T 15/005* (2013.01)

(58) Field of Classification Search
CPC ..... G06T 1/20; G06T 2210/52; G06T 15/80; G06T 1/60; G06T 1/00; G06T 15/60; G06T 17/05; G06T 2200/28; G06T 15/005; G06T 11/00; G06T 15/04; G06T 15/405; G06T 1/0007
USPC ........................................................ 345/506
See application file for complete search history.

(56) References Cited

U.S. PATENT DOCUMENTS

| | | |
|---|---|---|
| 7,671,862 B1 * | 3/2010 | Patel et al. .................... 345/501 |
| 7,747,842 B1 | 6/2010 | Goudy et al. |
| 2008/0316214 A1 | 12/2008 | Peeper |
| 2009/0295804 A1 * | 12/2009 | Goel et al. .................... 345/426 |
| 2010/0149185 A1 * | 6/2010 | Capewell et al. ............ 345/426 |
| 2011/0043518 A1 | 2/2011 | Von Borries et al. |
| 2011/0050716 A1 * | 3/2011 | Mantor et al. ................ 345/581 |

FOREIGN PATENT DOCUMENTS

| | | |
|---|---|---|
| CN | 101271584 A | 9/2008 |
| JP | 2005322224 A | 11/2005 |
| JP | 2009265843 A | 11/2009 |
| JP | 2011508918 A | 3/2011 |
| WO | 0116741 A2 | 3/2001 |
| WO | 2009082428 A1 | 7/2009 |

OTHER PUBLICATIONS

Hou et al., "BSGP: Bulk-Synchronous GPU Programming," ACM Transactions on Graphics, vol. 27, No. 3, Aug. 1, 2008, 13 pp.
International Search Report and Written Opinion—PCT/US2012/044008—ISA/EPO—Oct. 5, 2012, 13 pp.

(Continued)

Primary Examiner — Charles Tseng
(74) Attorney, Agent, or Firm — Shumaker & Sieffert, P.A.

(57) ABSTRACT

The example techniques described in this disclosure may be directed to synchronization between producer shaders and consumer shaders. For example, a graphics processing unit (GPU) may execute a producer shader to produce graphics data. After the completion of the production of graphics data, the producer shader may store a value indicative of the amount of produced graphics data. The GPU may execute one or more consumer shaders, after the storage of the value indicative of the amount of produced graphics data, to consume the produced graphics data.

40 Claims, 3 Drawing Sheets

(56) References Cited

OTHER PUBLICATIONS

Marroquim et al., "Introduction to GPU Programing with GLSL," Computer Graphics and Image Processing (SIBGRAPI Tutorials), Tutorials of the XXII Brazilian Symposium on IEEE, Piscataway, NJ, USA, Oct. 11, 2009, 14 pp.

Response to Written Opinion dated Oct. 5, 2012, from International application No. PCT/2012/044008, filed Apr. 30, 2013, 30 pp.

Xiao et al., "Inter-block GPU Communication via Fast Barrier Synchronization," Parallel & Distributed Processing (IPDPS), IEEE International Symposium on IEEE, Piscataway, NJ, USA, Apr. 19, 2010, 12 pp.

Park et al., "An effective depth data memory system using an escape count buffer for 3D rendering processors," IEICE Electronics Express, vol. 8, No. 4, pp. 209-214, Feb. 25, 2011.

Using the Geometry Shader for Compact and Variable-Length GPU Feedback, http://http.developer.nvidia.com/ GPUGems3/gpugems3_ch41.html, 2008, 17 pp.

Second Written Opinion of international application No. PCT/US2012/044008, dated Oct. 29, 2013, 5 pp.

International Preliminary Report on Patentability from international application No. PCTPCT/US2012/044008, dated Feb. 4, 2014, 8 pp.

\* cited by examiner

SYNCHRONIZATION OF SHADER OPERATION

TECHNICAL FIELD

This disclosure relates to graphics shaders, and more particularly, to execution of one or more graphics shaders on a graphics processing unit (GPU).

BACKGROUND

A device that generates viewable content generally includes a graphics processing unit (GPU). The GPU may process graphics data to generate pixel values for the pixels on a display. To process the graphics data, the GPU may execute one or more shader programs, often referred to as shaders. A shader program may be a software program that causes the GPU to perform functions defined by the shader program when the GPU executes the shader program. For instance, the shader program may define the manner in which the GPU should process graphics data to generate pixel values for the pixels on the display.

SUMMARY

In general, this disclosure describes techniques for synchronizing the execution of one or more shader programs on a graphics processing unit (GPU). In some examples, one shader program may generate graphics data that is consumed or utilized by another shader program. The shader program that generates the graphics data may be referred to as a producer shader, and the shader program that consumes the generated graphics data may be referred to as a consumer shader. Some of the example techniques described in this disclosure may cause a GPU to synchronize the execution of the producer and consumer shaders such that the GPU does not execute the consumer shader until the producer shader has generated the graphics data that is to be consumed by the consumer shader.

In one example, this disclosure describes a method that includes executing, with a graphics processing unit (GPU), a producer shader that produces graphics data, and storing, with the GPU, the graphics data produced by the producer shader in a storage location of a first buffer. The method further includes upon completion of the production of the graphics data, storing, with the producer shader executing on the GPU, a value indicative of an amount of the graphics data produced by the producer shader in a storage location of a second buffer.

In another example, this disclosure describes an apparatus that includes a first buffer, a second buffer, and a graphics processing unit (GPU). The GPU is operable to execute a producer shader that produces graphics data, and store the graphics data produced by the producer shader in a storage location of the first buffer. The GPU is also operable to, upon completion of the production of the graphics data, store, with the producer shader executing on the GPU, a value indicative of an amount of the graphics data produced by the producer shader in a storage location of the second buffer.

In another example, this disclosure describes an apparatus that includes a first buffer, a second buffer, and a graphics processing unit (GPU). The GPU includes means for executing a producer shader that produces graphics data, and means for storing the graphics data produced by the producer shader in a storage location of the first buffer. The GPU also includes, upon completion of the production of the graphics data, means for storing, with the producer shader executing on the GPU, a value indicative of an amount of the graphics data produced by the producer shader in a storage location of the second buffer.

In another example, this disclosure describes a non-transitory computer-readable storage medium. The non-transitory computer-readable storage medium includes instructions that cause one or more processors to execute, with a graphics processing unit (GPU), a producer shader that produces graphics data, and store, with the GPU, the graphics data produced by the producer shader in a storage location of a first buffer. The instructions also include instructions to, upon completion of the production of the graphics data, store, with the producer shader executing on the GPU, a value indicative of an amount of the graphics data produced by the producer shader in a storage location of a second buffer.

The details of one or more examples are set forth in the accompanying drawings and the description below. Other features, objects, and advantages will be apparent from the description and drawings, and from the claims.

DETAILED DESCRIPTION

Figure 1:
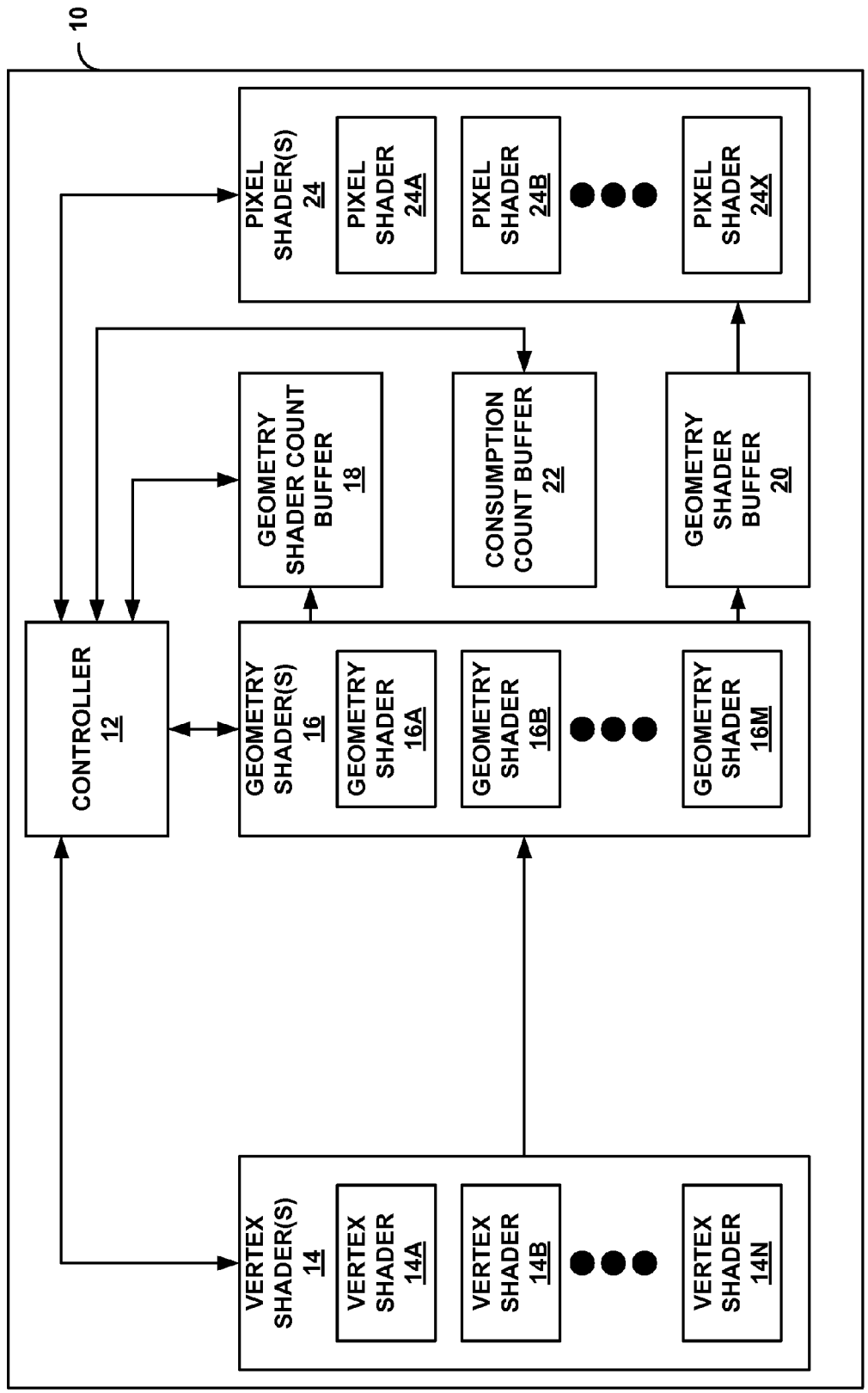
FIG. 1 is a block diagram illustrating an example of a graphics processing unit (GPU) that may be operable to implement one or more aspects of this disclosure.

In general, this disclosure relates to synchronization of various processes of a graphics processing unit (GPU). The techniques of this disclosure are generally applicable to video devices such as media players, set-top boxes, wireless handsets such as mobile telephones, personal digital assistants (PDAs), desktop computers, laptop computers, gaming consoles, display devices, televisions, and the like.

To process graphics data, a GPU initiates, e.g., executes, different shader programs. In some instances, graphics data produced by one shader program is consumed by another shader program. For example, a geometry shader may receive graphics data and produce graphics data for a plurality of primitives such as coordinates of vertices of the primitives and color values and other attributes for the vertices of the primitives. A pixel shader may receive the graphics data for the plurality of primitives and perform graphics processing on the plurality of primitives such as shading, illuminating, and blending to render pixels for presentation on a display.

In the previous example, the geometry shader may be considered as an example of a "producer" shader, and the pixel shader may be considered as an example of a "consumer" shader. In some examples, the GPU may need to synchronize the producer shader and the consumer shader such that the consumer shader does not attempt to consume graphics data before the producer shader has produced the graphics data. For example, in some instances, the GPU may know ahead of time when to execute a producer shader, but may not know ahead of time how much graphics data the producer shader will produce. Because the amount of graphics data the produce shader will produce is variable, the GPU may not know ahead of time when the producer shader will complete producing the graphics data.

Moreover, in some examples, there may be multiple producer shaders and multiple consumer shaders. In some of these examples, based on the graphics data, a consumer shader may not be able to consume graphics data from one of the producer shaders until another producer shader completes producing graphics data. For example, assume that the GPU executes a first producer shader, and at a time thereafter executes a second producer shader. Due to the variability in the amount of data each producer shader produces, it may be possible for the second producer shader to complete producing graphics data before the first producer shader completes producing graphics data. However, based on the graphics data produced by each of the producer shaders, a first consumer shader may need to consume the graphics data from the first producer shader before a second consumer shader consumes the graphics data from the second producer shader.

In some examples, the device that includes the GPU may also include a producer shader storage buffer and a producer shader count buffer. The producer shader storage buffer and the producer shader count buffer may be formed within the same memory device or different memory devices.

In some examples, the producer shader storage buffer may include a plurality of storage locations. The GPU may assign each storage location to one producer shader. Each producer shader may store its produced graphics data into its assigned storage location within the producer shader storage buffer. For example, graphics data produced by a first producer shader may be stored in the first storage location, and graphics data produced by the second producer shader may be stored in the second storage location, and so forth. In this example, the GPU may have assigned the first storage location to the first producer shader, the second storage location to the second producer shader, and so forth (for additional producer shaders).

The size of each of the storage locations, e.g., the amount of graphics data each storage location can store, may be based on the maximum amount of graphics data the producer shaders can produce. For example, the GPU may not know ahead of time how much graphics data a producer shader will produce; however, the GPU may know ahead of time the maximum amount of graphics data the producer shaders will produce. As one example, the maximum amount of graphics data that any producer shader may produce is 4 kilo-bytes (KB). Accordingly, in this example, for every producer shader that the GPU executes, the GPU may assign that producer shader a 4 KB storage location within the producer shader storage buffer to store the graphics data produced by that producer shader.

The producer shader count buffer may also include a plurality of storage locations. The GPU may assign each storage location within the producer shader count buffer to each producer shader. Because the GPU assigns a storage location within the producer shader count buffer and a storage location within the producer shader storage buffer to a producer shader, each storage location within the producer shader count buffer and each storage location within the producer shader storage buffer assigned to the same producer may be considered as corresponding to one another.

Each of the storage locations within the producer shader count buffer may store a value indicative of the amount of graphics data stored in its corresponding storage location within the producer shader storage buffer. In other words, a storage location within the producer shader count buffer may store a value indicative of the amount of graphics data produced by the producer shader assigned to that storage location within the producer shader count buffer.

As one example, a storage location within the producer shader count buffer may store a value that indicates the number of primitives produced by a producer shader. For instance, as described above, a geometry shader may produce graphics data for a plurality of primitives. In this example, the storage location within the producer shader count buffer assigned to the geometry shader may store a value indicative of the number of primitives produced by the geometry shader. Accordingly, the storage of a value indicative of the number of primitives produced by the geometry shader in the assigned storage location within the producer shader count buffer may indicate that the geometry shader has completed the production of graphics data.

In some examples, the number of bytes of graphics data produced by the geometry shader for each primitive may be constant; however, the number of primitives produced by the geometry shader may be variable. For instance, each primitive produced by a geometry shader may be defined by 100 bytes; however, the number of primitives produced by the geometry shader may be variable.

For purposes of illustration, as an example, assume that a first producer shader, e.g., a first geometry shader, produces data for five primitives, and a second producer shader produces data for ten primitives. Also, assume that each primitive is defined by 100 bytes. In this example, the storage location within the producer shader count buffer that is assigned to the first producer shader may store the value of five, and the storage location within the producer shader count buffer that is assigned to the second producer shader may store the value of ten. Also, in this example, the storage location within the producer shader storage buffer that is assigned to the first producer shader may store 500 bytes of graphics data, e.g., 5 primitives*100 bytes per primitive, and the storage location within the producer shader storage buffer that is assigned to the second producer may store 1 kilo-byte of graphics data, e.g., 10 primitives*100 bytes per primitive.

In some of the example implementations, the producer shader may output the value indicative of the amount of graphics data stored in its assigned storage location within the producer shader storage buffer after each producer shader completes producing the graphics data. For example, as the producer shader is producing graphics data, the GPU may output the produced graphics data, for storage, to the storage location within the producer shader storage buffer that is assigned to that producer shader. After the producer shader completes producing the graphics data, the producer shader may then store the value indicative of the amount of graphics data produced by that producer shader within the storage location of the producer shader count buffer assigned to that producer shader.

There may be at least two different techniques to cause the producer shader to output the value indicative of the amount of graphics data produced by the producer shader until after the producer shader completes producing the graphics data. As one example, the producer shader may be designed to maintain a counter value that indicates the amount of primitives that the producer shader produced. For instance, a programmer of the producer shader may write source code for the producer shader, and part of the source code may be instructions to cause the producer shader to maintain the counter value that indicates the amount of primitives that the producer shader produced.

A compiler may compile the source code that includes the instructions for the counter value to generate object code.

The instructions of the source code, applied as compiled object code, may cause the producer shader, when executed, to increment its counter value after every primitive it produces. After the producer shader completes producing the graphics data, the producer shader may output the counter value to the storage location within the count buffer assigned to that producer shader. For example, the source code may include instructions that cause the producer shader, when executed by the GPU, to output the counter value to the storage location within the count buffer assigned to that producer shader after the producer shader completes producing the graphics data.

As another example, it may be possible for producer shader programs to not include instructions for the counter in the source code. For example, the source code for some legacy producer shader programs may not include instructions for the counter value, or instructions to output the counter value after completion of the production of the graphics data. In such examples, the compiler may be developed such that it is capable of inserting object code instructions, during the compiling, that cause the producer shader to maintain the counter value, and output the counter value indicative of the amount of produced graphics data after the producer shader completes the production of the graphics data.

For instance, a compiler, executing on a processor other than the GPU, may be configured to compile the source code of each producer shader, and may be configured to generate instructions, e.g., the object code of the producer shader, that are executable by the GPU, and cause the GPU to perform functions of the producer shader. In generating the instructions of the producer shader, e.g., the object code of the producer shader, the compiler may include instructions that cause the producer shader, when executed, to maintain a counter value that indicates the amount of primitives that the producer shader produced, in addition to the instructions that cause the producer shader, when executed, to perform functions of the producer shader. The compiler may also include instructions in the object code of the producer shader that causes the producer shader to output the counter value, included in the producer shader, to the storage location within the count buffer assigned to that producer shader after the producer shader completes producing the graphics data In this manner, even in examples where the source code of the producer shader does not include the counter value (e.g., instructions for the counter value), aspects of this disclosure may allow for a compiler to include instructions for generation of the counter value into the object code of the producer shader. For instance, the compiler may compile the source code of the producer shader to generate the object code. In the process of generating the object code, the compiler may include the instructions for the counter value into the object code. As indicated above, the counter value may count the amount of graphics data produced by the producer shader while the producer shader is producing the graphics data.

The GPU may execute consumer shaders based on the count value stored in each of the storage locations of the producer shader count buffer. In some examples, the GPU may execute one consumer shader for each count value. For example, if a storage location in the producer shader count buffer stored the count value of five, the GPU may execute five consumer shaders to process the graphics data stored in a corresponding storage location within the producer shader storage buffer.

In some examples, the producer shader count buffer may be considered as an ordered producer shader count buffer.

For example, the GPU may assign a first storage location within the producer shader count buffer to a first producer shader whose graphics data should be consumed before graphics data from any other producer shader is consumed. The GPU may assign a second storage location within the producer shader count buffer to a second producer shader whose graphics data should be consumed after the first producer shader and before the graphics data from other producer shaders is consumed, and so forth.

In this manner, the GPU may be able to execute consumer shaders when the graphics data is ready to be consumed, rather than executing consumer shaders before the graphics data is ready to be consumed. As one example, for illustration purposes, assume that the GPU executes a first producer shader, and a time thereafter executes a second producer shader. In this example, the first producer shader is assigned to a first storage location within the count buffer, and the second producer shader is assigned to a second storage location within the count buffer. Further assume that the graphics data from the first producer shader should be consumed before the graphics data from the second producer shader.

In this example, the second producer shader completed producing graphics data before the first producer shader. Accordingly, the second storage location within the producer shader count buffer stored a value before the first storage location within the producer shader count buffer. Because the GPU may know, e.g., based on the order in which it executed the first and second producer shaders, that graphics data produced by the first producer shader should be consumed before the graphics data produced by the second producer shader, in this example, the GPU may withhold from executing consumer shaders until the first storage location within the producer shader count buffer stores a value. As described above, storage of a count value, e.g., the value indicative of the amount of produced graphics data, within a storage location of the producer shader count buffer indicates that the producer shader assigned to that storage location completed producing graphics data.

FIG. 1 is a block diagram illustrating an example of a graphics processing unit (GPU) 10 that may be operable to implement one or more aspects of this disclosure. GPU 10 may implement a graphics pipeline to generate graphics data such as pixel values for pixels on display. For example, GPU 10 may implement a graphics pipeline similar to that described in the OpenGL ES 2.0 specification, which was released on Apr. 24, 2008 by the Khronos Group, and is publicly available. As another example, aspects of this disclosure may be implemented in Microsoft® DirectX (DX) 10 and 11 application programming interfaces (APIs) that define a graphics pipeline. The graphics pipeline may be implemented as software executing on GPU 10, firmware executing on GPU 10, one or more hardware units formed on GPU 10, or a combination thereof. GPU 10 may implement other graphics pipelines as well, and aspects of this disclosure should not be considered limited to the graphics pipeline of the OpenGL ES 2.0 specification, or the DX 10 and 11 APIs.

Examples of GPU 10 include, but are not limited to, a digital signal processor (DSP), a general purpose microprocessor, an application specific integrated circuit (ASIC), a field programmable logic array (FPGA), or other equivalent integrated or discrete logic circuitry. As illustrated in FIG. 1, GPU 10 may include controller 12, geometry shader count buffer 18, geometry shader buffer 20, and consumption count buffer 22. Also, as illustrated in FIG. 1, GPU 10 may execute one or more instances of vertex shaders 14, geometry shaders 16, and pixel shaders 24.

GPU 10 may include additional units or modules that form the graphics pipeline. However, such additional units or modules are not illustrated in FIG. 1 for purposes of clarity. Moreover, although geometry shader count buffer 18, geometry shader buffer 20, and consumption count buffer 22 are illustrated as being internal to GPU 10, aspects of this disclosure are not so limited. In alternate examples, one or more of geometry shader count buffer 18, geometry shader buffer 20, and consumption count buffer 22 may be external GPU 10. For example, it may possible that the amount of graphics data that is to be stored in geometry shader buffer 20 is greater than the amount of storage space available on GPU 10. In these examples, geometry shader buffer 20 may be external to GPU 10. As an alternate, in some examples, it may be possible that geometry shader count buffer 18 and geometry shader buffer 20 are part of a common buffer, e.g., one buffer includes both geometry shader count buffer 18 and geometry shader buffer 20. Furthermore, consumption counter buffer 22 may potentially provide additional synchronization assistance to controller 12, as described below, but may not be necessary in every example of GPU 10.

Controller 12, of GPU 10, may be a hardware unit or a software unit executing on GPU 10. For purposes of illustration, controller 12 is described in the context of being a hardware unit. Controller 12 may determine when GPU 10 should execute one or more vertex shaders 14, geometry shaders 16, and pixel shaders 24. Controller 12 may also determine how many instantiations of vertex shaders 14, geometry shaders 16, and pixel shaders 24 GPU 10 should execute.

Vertex shaders 14, geometry shaders 16, and pixel shaders 24 may be software units executing on GPU 10. For purposes of illustration, vertex shaders 14, geometry shaders 16, and pixel shaders 24 are illustrated as residing within GPU 10. However, this is to illustrate that vertex shaders 14, geometry shaders 16, and pixel shaders 24 are executed by GPU 10. The instructions for vertex shaders 14, geometry shaders 16, and pixel shaders 24 may be stored in a storage device that is external to GPU 10. For example, the compiled object code or source code for vertex shaders 14, geometry shaders 16, and pixel shaders 24 may be stored in a storage device that is external to GPU 10.

It should be understood that vertex shaders 14, geometry shaders 18, and pixel shaders 24, as described in this disclosure, may generally take the form of functional units executed by GPU 10. Such functional units are described separately to highlight particular functional aspects of the shaders, and do not necessarily imply that such aspects must be structured, arranged or coded separately. Accordingly, such functional aspects may be formed integrally or separately, executed on one GPU or multiple GPUs, or multiple GPU cores, and the description should not be considered limiting as to the implementation of such functional aspects.

In some examples, controller 12 may receive attributes of an image that is to be displayed on a display. For example, a processor (not shown) external to GPU 10 may generate an image to be displayed on the display. The processor may divide the image into one or more primitives which may be polygons such as triangles, as one example. The processor may determine vertex attributes of each of the vertices of the polygons. For example, the processor may determine vertex coordinates and color values, e.g., red-green-blue (RGB) color values or luma and chroma values, of each of the vertices. The processor may transmit the vertex attributes of each of the vertices to controller 12 of GPU 10.

Controller 12 may determine how many instantiations of vertex shaders 14 should be executed by GPU 10 based on the, for example, the attributes received from the processor. For example, as illustrated in FIG. 1, GPU 10 may execute vertex shaders 14A-14N. Each one of these vertex shaders 14A-14N may perform similar functions, but on different sets of graphics data. For example, a storage device external to GPU 10 may store instructions for a vertex shader. GPU 10 may execute multiple instances of the instructions of the vertex shader, as determined by controller 12, which are represented as vertex shaders 14A-14N.

In some examples, controller 12 may cause GPU 10 to execute one of vertex shaders 14 for each primitive. For example, controller 12 may cause GPU 10 to execute vertex shader 14A to process the first primitive, cause GPU 10 to execute vertex shader 14B to process the second primitive, and so forth. In this manner, GPU 10 may be able to execute multiple instances of vertex shaders 14 in parallel. However, aspects of this disclosure are not so limited. Controller 12 may not necessarily cause GPU 10 to execute one of vertex shaders 14 for each primitive.

Vertex shaders 14, when executed, may convert the received coordinates of the vertices of the polygons into coordinates of the display, and may determine light values for the vertices. For example, vertex shaders 14 may rotate and scale the received polygons to generate primitives. The output of vertex shaders 14 may be attributes of vertices of the primitives. Vertex shaders 14 may transmit the attributes of the vertices, as determined by vertex shaders 14, to geometry shaders 16.

Similar to vertex shaders 14, a storage device external to GPU 10 may store the instructions for a geometry shader. Controller 12 may determine how many instantiations of geometry shaders 16 GPU 10 should execute, which are represented as geometry shaders 16A-16M, based on, for example, the number of primitives generated by vertex shaders 14. In some examples, the number of geometry shaders 16 that GPU 10 should execute may be the same as the number of vertex shaders 14 GPU 10 executed. However, aspects of this disclosure are not so limited. Geometry shaders 16A-16M may perform similar functions, but on different data.

Each one of geometry shaders 16 may receive vertex attributes of vertices for a single primitive from one of vertex shaders 14. In some examples, geometry shaders 16 may further divide the single primitive into one or more primitives. For instance, geometry shader 16A may receive vertices of single triangle, and may divide the single triangle to produce five triangles. Geometry shaders 16 may also determine the attributes, e.g., color and coordinates, for each of the vertices of the primitives produced by geometry shaders 16. The primitives produced by geometry shaders 16, including the vertices and their corresponding attributes, may be referred to as the graphics data produced by geometry shaders 16.

In some examples, the number of primitives that each one of geometry shaders 16 may produce may be unknown. Also, it may be unknown when each one of geometry shaders 16 will finish producing the primitives. For example, controller 12 may determine that GPU 10 should execute two geometry shaders 16, e.g., geometry shader 16A and geometry shader 16B, and may cause GPU 10 to execute geometry shader 16A and geometry shader 16B. In this example, controller 12 may not know how many primitives geometry shader 16A will produce and how many primitives geometry shader 16B will produce.

Controller 12 may know how many bytes are used to represent a primitive based on the programming of geometry shaders 16. For example, each of the primitives generated by geometry shaders 16 may be represented by 100 bytes, e.g., the 100 bytes represent the vertices and the attributes of a primitive generated by one of geometry shaders 16. However, because controller 12 may not know how many primitives geometry shaders 16 may produce, controller 12 may not know how many total bytes geometry shaders 16 may produce.

Also, controller 12 may not know when each of geometry shaders 16 will complete producing the primitives. For example, controller 12 may cause GPU 10 to first execute geometry shader 16A and then execute geometry shader 16B. In this example, it may be possible that geometry shader 16B completes producing its primitives before geometry shader 16A completes producing its primitives.

These uncertainties, e.g., the amount of graphics data geometry shaders 16 will produce and when geometry shaders 16 will complete producing the graphics data, may make it difficult for controller 12 to determine when to execute one or more pixel shaders 24. Pixel shaders 24 may consume the graphics data, e.g., primitives and corresponding attributes, produced by geometry shaders 16. Accordingly, one or more of geometry shaders 16 may be examples of "producer" shaders, and one or more pixel shaders 14 may be examples of "consumer" shaders.

In other words, one or more producer shaders may produce graphics data that is consumed by one or more consumer shaders. One non-limiting example of the producer shaders is geometry shaders 16, and one non-limiting example of the consumer shaders is pixel shaders 24. Although examples described in this disclosure describe geometry shaders 16 as being producer shaders and pixel shaders 24 as being consumer shaders, aspects of this disclosure are not so limited. In general, the example techniques described in this disclosure may be extendable to any shader that produces a variable amount of graphics data, and to any shader that should consume the produced variable amount of graphics data. The example techniques described in this disclosure may be extendable to any graphics system where synchronization of execution of producer and consumer shaders may be desirable.

It may be advantageous for GPU 10 to execute one or more pixel shaders 24 after the data that is to be consumed by each one of the one or more pixel shaders 24 is available. For example, if controller 12 caused GPU 10 to execute one or more pixel shaders 24 before graphics data that is to be consumed by the executed pixel shaders 24 is available, then these executed pixel shaders 24 may remain idle, e.g., in a "busy wait" state, until the graphics data that is to be consumed is available. In the "busy wait" state, the executed pixel shaders 24 remain in a loop waiting for the graphics data that is to be consumed, exit the "busy wait" state when graphics data becomes available, and then consume the graphics data. The "busy wait" state may be undesirable because hardware units of GPU 10, such as registers or allocated memory, which are to be used by the executed pixel shaders 24 when consuming the graphics data, are unavailable for other tasks while the executed pixel shaders 24 are waiting for graphics data to consume.

Some of the example techniques described in this disclosure may allow controller 12 to synchronize execution of one or more pixel shaders 24 such that GPU 10 executes one or more pixel shaders 24 after the graphics data that is to be consumed by the one or more pixel shaders 24 is available. As illustrated in FIG. 1, GPU 10 may include geometry shader count buffer 18. Geometry shader count buffer 18 may include a plurality of storage locations. For example, geometry shader count buffer 18 may be registers or part of the local memory, e.g., an internal cache, of GPU 10. In some examples, controller 12 and GPU 10 may be able to access the contents of geometry shader count buffer 18 relatively quickly without requiring access through an external system bus. As described above, in some examples, geometry shaders 16 may be examples of producer shaders. Accordingly, geometry shader count buffer 18 may be referred to as a producer shader count buffer.

Controller 12 may assign each of the plurality of storage locations of geometry shader count buffer 18 to each of the executed geometry shaders 16. For example, controller 12 may assign the first storage location of geometry shader count buffer 18 to one of the executed geometry shaders 16, assign the second storage location of geometry shader count buffer 18 to another one of the executed geometry shaders 16, and so forth. Each one of the executed geometry shaders 16 may store a value indicative of the amount of graphics data it produced into its assigned storage location of geometry shader count buffer 18. As one example, the value indicative of the amount of graphics data produced by one of the executed geometry shaders 16 may be a value of the amount of primitives produced by that one of geometry shaders 16.

In some examples, each one of the executed geometry shaders 16 may store the value indicative of the amount of graphics data produced by that one of geometry shaders 16 after it completes the production of the graphics data. For example, as illustrated in FIG. 1, geometry shaders 16 may output their produced graphics data to geometry shader buffer 20 as it is being produced. For example, geometry shader 16A may produce three primitives, and may output the graphics data of each primitive to geometry shader buffer 20 after it completes the production of graphics data for each primitive. Geometry shader 16A may then store the value of three (designating three primitives as output data) in the storage location of geometry shader count buffer 18 assigned to geometry shader 16A after geometry shader 16A completes the production of graphics data for the third primitive.

In some examples, geometry shaders 16 may be tasked with storing the value indicative of the amount of produced graphics data because geometry shaders 16 may be operable to count the amount of produced graphics data, e.g., count the number of produced primitives. Otherwise, another unit, such as controller 12 may be required to track the amount of primitives produced by geometry shaders 16 which may be inefficient and may unnecessarily consume processing power.

Also, as indicated above controller 12 may not know how many primitives geometry shaders 16 may produce. Accordingly, in some examples, geometry shaders 16 may be well suited to store the value indicative of the amount of produced graphics data because geometry shaders 16 will know when they have completed the production of graphics data.

For instance, in this example, after geometry shader 16A completes production of the graphics data of the first primitive or the second primitive, geometry shader 16 may not yet store a value indicative of the amount of graphics data produced by geometry shader 16. Rather, geometry shader 16A may wait until it has completed the production of the graphics data for all three primitives before storing a value indicative of the amount of graphics data produced by geometry shader 16A. Accordingly, the storage of a value indicative of the amount of produced graphics data in a storage location of geometry shader count buffer 18 may indicate that the geometry shader of geometry shaders 16 assigned to that storage location of geometry shader count buffer 18 has completed the production of its graphics data.

There may be at least two techniques to ensure that the executed geometry shaders 16 do not store a value indicative of the amount of produced graphics data until the completion of the production of the graphics data. As one example technique, geometry shaders 16 may be designed with a counter. For example, a programmer writing the source code for geometry shaders 16 may include instructions within the source code for geometry shaders 16 to maintain a counter.

A compiled version of the source code may cause geometry shaders 16 to increment their counter values after production of each primitive to indicate the amount of graphics data produced by geometry shaders 16, e.g., the number of produced primitives. The source code may also include instructions that cause geometry shaders 16 to output the counter value to their assigned storage locations within geometry shader count buffer 18 after geometry shaders 16 complete production of the graphics data.

However, in some examples, it may be possible that geometry shaders 16 were not designed with a counter, e.g., the counter is not part of the source code of geometry shaders 16. For example, source code for legacy geometry shaders 16 may not have been designed with the counter. In these instances, a compiler may be designed to include the counter within geometry shaders 16. For example, a processor (not shown) may be executing a compiler that compiles the source code for a geometry shader to generate object code that is executable by GPU 10. Instantiations of the compiled geometry shader may be geometry shaders 16. During the compilation, the compiler may include instructions into the object code of the geometry shader to maintain a counter that increments after the executed geometry shaders 16 produce a primitive. The compiler may also include instructions in the object code of the geometry shader to store the counter value in the assigned storage location within geometry shader count buffer 18 after completion of the production of the graphics data. In this manner, the executed geometry shaders 16 may be able to store a value indicative of the amount of produced graphics data even when geometry shaders 16 were not designed with a counter, e.g., even where the counter value is not part of the source code for geometry shaders 16.

In either of the above example techniques, the compiler may compile the source code to generate object code for geometry shaders 16 that is executable by GPU 10. In the first example technique, the source code for geometry shaders 16 may already include instructions to maintain a counter, and may also include instructions to cause geometry shaders 16 to output the counter value at the completion of the production of the graphics data. The compiler may compile the source code instructions for the counter, and the instructions that cause geometry shaders 16 to output the counter value at the completion of the production of the graphics data to generate the executable object code.

In the second example technique, the source code for geometry shaders 16 may not include instructions to maintain a counter, and may not include instructions to cause geometry shaders 16 to output the counter value at the completion of the production of the graphics data. In this example, the compiler may be designed to proactively include object code instructions, as an add-in to the object code, for the counter and object code instructions that cause geometry shaders 16 to output the counter value at the completion of the production of the graphics data. In this manner, even for legacy geometry shaders 16, the compiler may be able to generate object code, executable by GPU 10, that causes geometry shaders 16 to maintain the counter and output the counter value at the completion of the production of the graphics data.

Controller 12 may determine how many pixel shaders 24 to execute based on the values stored in geometry shader count buffer 18. For example, similar to vertex shaders 14 and geometry shaders 16, a storage device external to GPU 10 may store instructions for a pixel shader, e.g., object or source code for the pixel shader. Controller 12 may execute one or more instances of pixel shaders 24, represented as pixel shaders 24A-24X. Pixel shaders 24 may perform similar functions, but on different graphics data. Pixel shaders 24 may receive the primitives produced by geometry shaders 16 and perform one or more functions such as rasterizing, shading, blending, illuminating, and other graphics related functions on the received primitives. The output of pixel shaders 24 may be the pixel values for the pixels that are to be displayed on the display.

Controller 12 may determine how many instances of pixel shaders 24 to execute based on the values stored in geometry shader count buffer 18. As one example, controller 12 may execute one of pixel shaders 24 for each primitive generated by each of geometry shaders 16. For instance, assume that the first storage location of geometry shader count buffer 18 stored the value of five, the second storage location of geometry shader count buffer 18 stored the value of six, the third storage location of geometry shader count buffer 18 stored the value of ten, and the fourth storage location of geometry shader count buffer 18 stored the value of one. Also, assume that the first through the fourth storage locations of geometry shader count buffer 18 are assigned to geometry shaders 16A-16D, respectively.

In this example, controller 12 may execute five instances of pixel shaders 24 that each consume the graphics data of one of the five primitives produced by geometry shader 16A. Controller 12 may then execute six instances of pixel shaders 24 that each consume the graphics data of one of the six primitives produced by geometry shader 16B, then execute ten instances of pixel shaders 24 that each consume the graphics data of one of the ten primitives produced by geometry shader 16C, followed by execution of one instance of pixel shaders 24 that consumes the graphics data of the one primitive produced by geometry shader 16D.

Controller 12 need not necessarily wait until the completion of the execution of the first instances of pixel shaders 24 before beginning the execution of the next instances of pixel shaders 24. For example, controller 12 may not wait until the completion of the execution of the first five instances of pixel shaders 24 before beginning the execution of the next six instances of pixel shaders 24 in the previous example. Controller 12 may execute the first instances of pixel shaders 24, and, in some examples, while the first instances of pixel shaders 24 are executing, may begin the execution of the next instances of pixel shaders 24. In other words, GPU 10 may execute multiple instances of pixel shaders 24 in parallel, in some examples.

In some examples, graphics data generated by one of geometry shaders 16 may need to be consumed before graphics data from another one of geometry shaders 16. For example, two geometry shaders of geometry shaders 16 may produce graphics data for overlapping primitives. In this example, the graphics data for the overlapped primitive may need to be consumed before the graphics data for the overlapping primitive so that pixel shaders 24 can properly blend the colors of the overlapping and overlapped primitives. However, it may be possible that the geometry shader of geometry shaders 16 that produced the overlapping primitive completed production of its primitives before the geometry shader of geometry shaders 16 that produced the overlapped primitive completed production of its primitives.

To ensure that graphics data produced by geometry shaders 16 is consumed in proper order, geometry shader count buffer 18 may function as an ordered count buffer. For instance, controller 12 may assign a storage location, e.g., the first storage location, within geometry shader count buffer 18 to a first one of geometry shaders 16 whose graphics data should be consumed before graphics data from any other geometry shaders 16 is consumed. Controller 12 may assign another storage location, e.g., the second storage location, within geometry shader count buffer 18 to a second one of geometry shaders 16 whose graphics data should be consumed after the first one of geometry shaders 16 and before the graphics data from any other geometry shaders 16 is consumed, and so forth.

With an ordered count buffer, controller 12 may ensure that it executes pixel shaders 24 to consume the graphics data in the order in which it should be consumed. For example, controller 12 may monitor the values stored in the storage locations within geometry shader count buffer 18. Controller 12 may wait to execute one or more pixel shaders 24 until the storage location within geometry shader count buffer 18, which is assigned to the geometry shader of geometry shaders 16 whose graphics data should be consumed first, stores a value indicative of the produced graphics data.

In some instances, it may be possible that a storage location within geometry shader count buffer 18 stores a value indicative of the amount of produced graphics data before a storage location within geometry shader count buffer 18, which is assigned to the geometry shader of geometry shaders 16 whose graphics data should be consumed first, stores a value indicative of the amount of produced graphics data. In these instances, controller 12 may not execute one or more pixel shaders 24 until after the storage location within geometry shader count buffer 18 that is assigned to the geometry shader of geometry shaders 16 whose graphics data should be consumed first stores a value indicative of the amount of produced graphics data.

As an illustrative example, assume that GPU 10 executes geometry shaders 16A and 16B. Also, assume that the graphics data produced by geometry shader 16A should be consumed before the graphics data produced by geometry shader 16B. Controller 12 may assign the first storage location within geometry shader count buffer 18 to geometry shader 16A, and assign the second storage location within geometry shader count buffer 18 to geometry shader 16B.

In this illustrative example, geometry shader 16B completed producing graphics data before geometry shader 16A. Accordingly, the second storage location within geometry shader count buffer 18 may store a value indicative of the amount of graphics data produced by geometry shader 16B before the first storage location within geometry shader count buffer 18 stores a value indicative of the amount of graphics data produced by geometry shader 16A. Although the second storage location of geometry shader count buffer 18 may store a value, controller 12 may not yet execute one or more pixel shaders 24 because the graphics data produced by geometry shader 16A should be consumed first, and geometry shader 16A has not yet completed the production of graphics data. Controller 12 may know that geometry shader 16A has not yet completed the production of graphics data because the first storage location within geometry shader count buffer 18 has yet to store a value indicative of the amount of graphics data produced by geometry shader 16A. As described above, the storage locations within geometry shader count buffer 18 store values after their assigned geometry shaders 16 complete production of graphics data.

In this manner, controller 12 may synchronize the execution of one or more pixel shaders 24 and geometry shaders 16. For example, utilizing some of the example techniques described in this disclosure, controller 12 may ensure that GPU 10 executes one or more pixel shaders 24 when the graphics data is available for consumption. Also, utilizing some of the example techniques described in this disclosure, controller 12 may ensure that pixel shaders 24 do not only consume the graphics data when available, but also consume the graphics data in the order in which the graphics data should be consumed.

Consumption count buffer 22 may further assist controller 12 in synchronizing the execution of one or more pixel shaders 24. Similar to geometry shader count buffer 18, consumption count buffer 22 may be registers or part of the local memory, e.g., an internal cache, of GPU 10. Consumption count buffer 22 may not be necessary in every example of GPU 10.

Consumption count buffer 22 may function as a counter-of-counters. For example, consumption count buffer 22 may store a value that, in some instances, indicates how many geometry shaders 16 have produced graphics data that is yet to be consumed. The value of consumption count buffer 22 may initially be zero. Controller 12 may increment the value of consumption count buffer 22 when a geometry shader of geometry shaders 16 stores a value indicative of the amount of produced graphics data in its assigned storage location within geometry shader count buffer 18. Controller 12 may decrement the value of consumption count buffer 22 after the graphics data produced by a geometry shader of geometry shaders 12 is consumed.

In some examples, controller 12 may increment the value of consumption count buffer 22 after the geometry shader of geometry shader 16 whose graphics data should be consumed first stores a value indicative of the amount of produced graphics data in its assigned storage location within geometry shader count buffer 18. For instance, keeping with the illustrative example above, if geometry shader 16B stores a value in geometry shader count buffer 18 before geometry shader 16A, then controller 12 may not yet increment the value of consumption count buffer 22. Then, when geometry shader 16A stores a value in geometry shader count buffer 18, controller 12 may increment the value of consumption count buffer 22 from zero to two.

Controller 12 may monitor the value stored in consumption count buffer 22 to determine which storage locations of the ordered geometry shader count buffer 18 store values indicative of produced graphics data. For example, if consumption count buffer 22 stored the value of six, then controller 12 may know that the first six storage locations of geometry shader count buffer 18 store values. Controller 12 may then know that controller 12 should now begin the execution of sufficient pixel shaders 24 to consume the graphics data produced by six geometry shaders 16.

As illustrated in FIG. 1, geometry shaders 16 may output their produced graphics data to geometry shader buffer 20. Geometry shader buffer 20 may be referred to as a producer shader buffer because geometry shader 16 may be examples of producer shaders. Although FIG. 1 illustrates geometry shader buffer 20 as being a part of GPU 10, aspects of this disclosure are not so limited. In some examples, the amount of graphics data that geometry shader buffer 20 should store may be greater than the amount of storage space available on GPU 10. In these examples, geometry shader buffer 20 may be external to GPU 10, and may reside in a storage device that GPU 10 can access with a system bus.

Geometry shader buffer 20 may include a plurality of storage locations. Each of the storage locations may store graphics data produced by each of the executed geometry shaders 16. For example, controller 12 may assign the first storage location of geometry shader buffer 20 to geometry shader 16A, the second storage location of geometry shader buffer 20 to geometry shader 16B, and so forth. Each one of geometry shaders 16 may output their produced graphics data to their assigned storage location within geometry shader buffer 20 as they are producing the graphics data.

For example, if geometry shader 16A produces five primitives, then geometry shader 16A may output the graphics data for the first primitive to the first storage location of geometry shader buffer 20 after geometry shader 16A produces the graphics data for the first primitive, followed by storing the graphics data for the second primitive in the first storage location of geometry shader buffer 20, and so forth. As described above, while geometry shader 16A may output its produced graphics data to the first storage location of geometry shader buffer 20 as it is producing the graphics data, geometry shader 16A may not output the value indicative of the amount of produced data to its assigned storage location in geometry shader count buffer 18 until after geometry shader 16A completes the production of the graphics data for all five primitives.

In some examples, although controller 12 may not know how much graphics data each of the geometry shaders 16 may produce, controller 12 may know ahead of time the maximum amount of graphics data each geometry shaders 16 may produce. For example, each one of geometry shaders 16 may be designed such that they are limited in the total amount of graphics data they can produce. The size of the storage locations of geometry shader buffer 20, e.g., the amount of graphics data that each storage location of geometry shader buffer 20 can store, may be equal to the maximum amount of graphics data that each one of geometry shaders 16 can produce.

As one example, the maximum amount of graphics data that each one of geometry shaders 16 can produce may be 4 kilo-bytes (KB), although aspects of this disclosure are not so limited. In this example, the size of the storage locations of geometry shader buffer 20 may be 4 KB.

In some examples, the graphics data stored in the storage locations of geometry buffer 20 may be "sparsely populated." For instance, in some examples, each primitive generated by each of geometry shaders may be represented by 100 bytes. If one of geometry shaders 16 produces five primitives, then the storage location of geometry buffer 20 assigned to that one of geometry shaders 16 may store 500 bytes, e.g., 5 primitives*100 bytes per primitive. Therefore, in this example, one of geometry shaders 16 stored 500 bytes in a storage location of geometry shader buffer 20 that can store up to 4 KB. Because the storage location of geometry buffer 20 stores one-eighth of the total amount of data that it can store, e.g., 500 bytes divided 4 KB, the data within the storage location of geometry buffer 20 may be considered as being sparely populated, in this example.

Each one of pixel shaders 24 may consume the graphics data stored in the storage locations of geometry shader buffer 20. For instance, assume that the graphics data produced by geometry shader 16A should be consumed before the graphics data from any other one of geometry shaders 16. Also, assume that controller 12 assigned the first storage location of geometry shader count buffer 18 to store the value indicative of the amount of graphics data produced by geometry shader 16A. In this example, after geometry shader 16A stores the value indicative of the amount of produced graphics data in the first storage location of geometry shader count buffer 18, controller 12 may cause GPU 10 to execute one or more pixel shaders 24 that consume the graphics data from the storage location of geometry shader buffer 18 assigned to geometry shader 16A.

Figure 2:
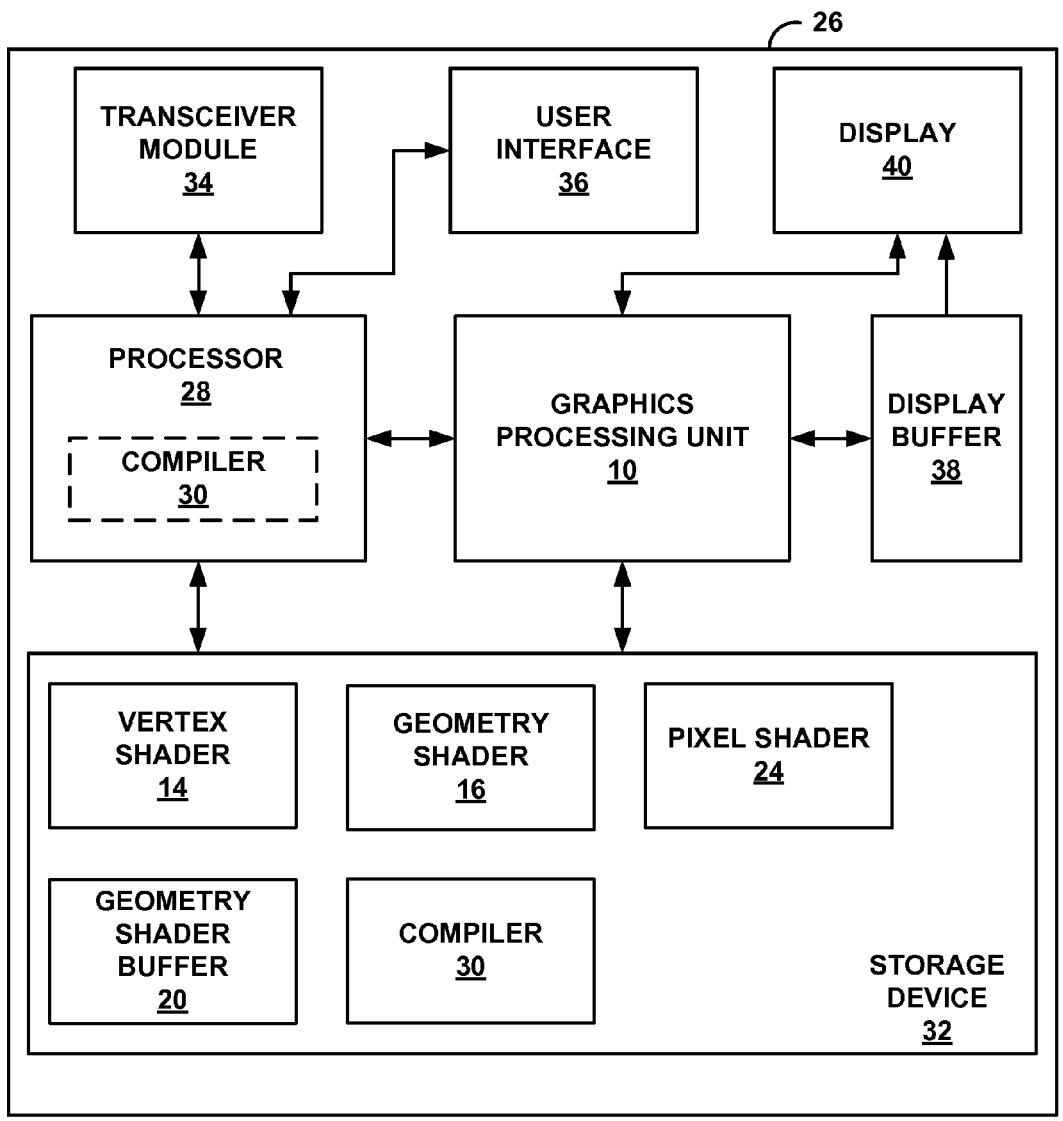
FIG. 2 is a block diagram illustrating an example of a computing device that may incorporate the GPU of FIG. 1 to implement one or more aspects of this disclosure.

FIG. 2 is a block diagram illustrating an example of a device 26 that may be operable to implement one or more aspects of this disclosure. Examples of device 26 include, but are not limited to, video devices such as media players, set-top boxes, wireless handsets such as mobile telephones, personal digital assistants (PDAs), desktop computers, laptop computers, gaming consoles, video conferencing units, tablet computing devices, and the like. Device 26 may include processor 28, graphics processing unit (GPU) 10, storage device 32, transceiver module 24, user interface 36, display buffer 38, and display 40. GPU 10 of device 26, as illustrated in FIG. 2, may be identical or substantially similar to GPU 10 of FIG. 1. Accordingly, the example functionality of GPU 10 is not discussed further in the example of FIG. 2.

Although processor 28 and GPU 10 are illustrated as separate units, aspects of this disclosure are not so limited. In some examples, processor 28 and GPU 10 may be formed in a common integrated circuit (IC). Processor 28 and GPU 10 may each include a single processor core or multiple processor cores.

Device 26 may include additional modules or units not shown in FIG. 2 for purposes of clarity. For example, device 26 may include a speaker and a microphone, neither of which are shown in FIG. 2, to effectuate telephonic communications in examples where device 26 is a mobile wireless telephone, or a speaker where device 26 is a media player. Furthermore, the various modules and units shown in device 26 may not be necessary in every example of device 26. For example, user interface 36 and display 40 may be external to device 26 in examples where device 26 is a desktop computer or other device that is equipped to interface with an external user interface or display.

Examples of processor 28 include, but are not limited to, a DSP, a general purpose microprocessor, an ASIC, a FPGA, or other equivalent integrated or discrete logic circuitry. Storage device 32 may comprise one or more computer-readable storage media. Examples of storage device 32 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to store desired program code in the form of instructions or data structures and that can be accessed by a computer, a processor, or a GPU. In some example implementations, storage device 32 may include instructions that cause processor 28 and/or GPU 10 to perform the functions ascribed to processor 28 and GPU 10 in this disclosure.

Storage device 32 may, in some examples, be considered as a non-transitory storage medium. The term "non-transitory" may indicate that the storage medium is not embodied in a carrier wave or a propagated signal. However, the term "non-transitory" should not be interpreted to mean that storage device 32 is non-movable. As one example, storage device 32 may be removed from device 26, and moved to another device. As another example, a storage device, substantially similar to storage device 32, may be inserted into device 26. In certain examples, a non-transitory storage medium may store data that can, over time, change (e.g., in RAM).

Examples of user interface 36 include, but are not limited to, a trackball, a mouse, a keyboard, and other types of input devices. User interface 36 may also be a touch screen and may be incorporated as a part of display 40. Transceiver module 34 may include circuitry to allow wireless or wired communication between device 26 and another device or a network. Transceiver module 34 may include modulators, demodulators, amplifiers and other such circuitry for wired or wireless communication.

As illustrated in FIG. 2, storage device 32 may store instructions for vertex shader 14, geometry shader 16, and pixel shader 24, e.g., source code and/or object code. GPU 10 may execute multiple instances of the instructions of vertex shader 14, geometry shader 16, and pixel shader 24 for the instantiations of vertex shaders 14A-14N, geometry shaders 16A-16M, and pixel shaders 24A-24x, as illustrated in FIG. 1.

Also, in some examples, storage device 32 may include geometry shader buffer 20. As described above, geometry shader buffer 20 may store the graphics data produced by one or more of geometry shaders 16A-16M. Storage device 32 may include geometry shader buffer 20 because, in some examples, it may be possible that the amount of graphics data that is to be stored in geometry shader buffer 20 is greater than the amount of storage space available on GPU 10.

Storage device 32 may, in some examples, store instructions for compiler 30. However, storage of instructions for compiler 30 may not be necessary in every example of device 26. Compiler 30 may, in some example implementations, include instructions that when executed cause processor 28 to include a counter within the instructions of geometry shader 16. For example, processor 28 may execute the instructions of compiler 30, as illustrated in FIG. 2, to compile geometry shader 16, e.g., receive source code for geometry shader 16 and generate object code for geometry shader 16. Processor 28 may then store the compiled geometry shader 16 in storage device 32. When GPU 10 executes one or more instances of geometry shader 16, e.g., geometry shaders 16A-16M, each one of geometry shaders 16A-16M may increment their respective counters that indicate an amount of graphics data produced by each one of geometry shaders 16A-16M.

GPU 10, via one or more pixel shaders 24, may output the pixel values for an image that is to be displayed on display 40. In some examples, GPU 10 may output the pixel values directly to display 40. In some alternate examples, GPU 10 may output the pixel values of the image to display buffer 38. Display buffer 38 may temporarily store the pixel values of image until the entire image is rendered. Display buffer 38 may be considered as an image frame buffer. Display buffer 38 may then transmit the rendered image to be displayed on display 40. Display 40 may comprise a liquid crystal display (LCD), an organic light emitting diode display (OLED), a cathode ray tube (CRT) display, a plasma display, or another type of display device.

Figure 3:
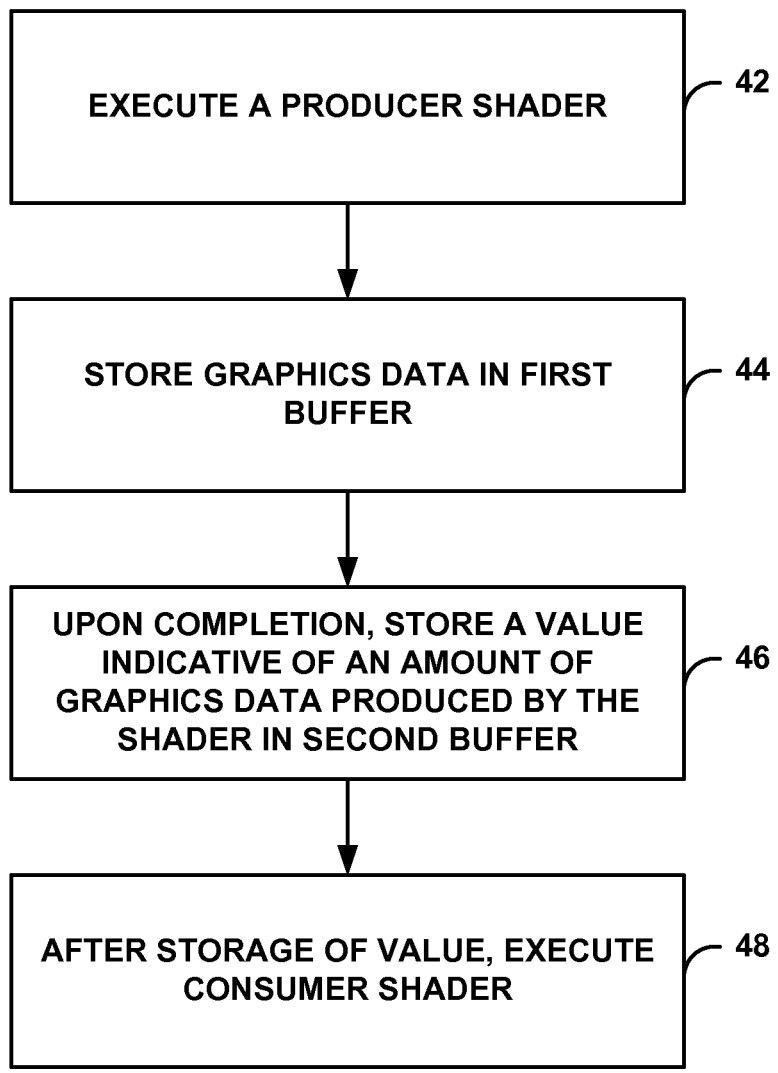
FIG. 3 is a flow chart illustrating an example operation of a GPU, as shown in FIG. 1, in accordance with one or more aspects of this disclosure.

FIG. 3 is a flow chart illustrating an example operation of GPU 10 in accordance with one or more aspects of this disclosure. For purposes of illustration only, reference is made to FIGS. 1 and 2.

GPU 10 may execute a producer shader that produces graphics data (42). Examples of the producer shader include one or more geometry shaders 16. As described above, the one or more geometry shaders may each receive one primitive from one or more vertex shaders 14 and divide the one primitive into one or more primitives. The graphics data produced by the producer shader may be attributes of the vertices of the produced one or more primitives, e.g., color and coordinate values for the vertices of the produced one or more primitives.

GPU 10 may store the produced graphics data in a storage location of a first buffer (44). One example of the storage location of the first buffer may be a storage location within a producer shader buffer. An example of the producer shader buffer may be geometry shader buffer 20. In the example where geometry shader buffer 20 is part of storage device 32, GPU 10 may access geometry shader buffer 20 via a system bus.

Upon completion of the production of graphics data, the producer shader may store a value indicative of the amount of graphics data produced by the producer shader in a storage location of a second buffer (46). An example of the storage location within the second buffer may be a storage location within a producer shader count buffer. One example of the producer shader count buffer may be geometry shader count buffer 18. One example of the value indicative of the amount of graphics data produced by the producer shader may be an amount of primitives produced by the producer shader. In some examples, the producer shader may be suitable for storing the number of produced primitives because the producer shader may know when it has completed the production of the graphics data. However, other units, such as controller 12 may not know when the producer shader will complete the production of graphics data.

After storage of the value indicative of the amount of graphics data produced by the producer shader, GPU 10 may execute one or more consumer shaders (48). By executing the one or more consumer shaders after storage of the value indicative of the amount of graphics data produce by the producer shader, controller 12 may ensure that the one or more consumer shaders are not executed before graphics data to be consumed by the one or more consumer shaders is available. Examples of the consumer shaders include the one or more pixel shaders 24.

In one or more examples, the functions described may be implemented in hardware, software, firmware, or any combination thereof. If implemented in software, the functions may be stored as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
executing, with a graphics processing unit (GPU), a producer shader that produces graphics data;
storing, with the GPU, the graphics data produced by the producer shader in a storage location of a first buffer;
during production of the graphics data by the producer shader, counting an amount of the graphics data that is being produced by the producer shader;
upon completion of the production of the graphics data, storing, with the producer shader executing on the GPU, a value indicative of the amount of the graphics data produced by the producer shader in a storage location of a second buffer; and
after storing the value indicative of the amount of graphics data produced by the producer shader in the storage location of the second buffer, executing one or more consumer shaders to consume the graphics data stored in the storage location of the first buffer based on the value indicative of the amount of graphics data produced by the producer shader.

2. The method of claim 1, wherein the first and second buffer are part of a common buffer.

3. The method of claim 1,
wherein executing one or more consumer shaders comprises executing a pixel shader to consume the graphics data stored in the storage location of the first buffer.

4. The method of claim 1, wherein the producer shader comprises a first producer shader, wherein the graphics data comprises first graphics data, wherein the second buffer comprises a first storage location and a second storage location, and wherein the value is stored in the first storage location of the second buffer, the method further comprising:
executing a second producer shader that produces a second graphics data;
storing the second graphics data produced by the second producer shader in another, different storage location of the first buffer;
during production of the second graphics data by the second producer shader, counting an amount of the second graphics data produced by the second producer shader; and
upon completion of the production of the second graphics data, storing, with the second producer shader, a value indicative of the amount of the second graphics data produced by the second producer shader in the second storage location of the second buffer.

5. The method of claim 4, wherein the second producer shader completes the production of the second graphics data before the first producer shader completes the production of the first graphics data, the method further comprising:
not executing the one or more consumer shaders to consume the second graphics data stored in the another, different storage location of the first buffer until the first producer shader completes production of the first graphics data and until the first producer shader stores the value indicative of the amount of graphics data produced by the first producer shader in the first storage location of the second buffer.

6. The method of claim 5, further comprising:
executing a first consumer shader of the one or more consumer shaders to consume the first graphics data after the first producer shader stores the value indicative of the amount of graphics data stored in the storage location of the first buffer; and
after the execution of the first consumer shader, executing a second consumer shader of the one or more consumer shaders to consume the second graphics data after the second producer shader stores the value indicative of the amount of graphics data stored in the another, different storage location of the first buffer.

7. The method of claim 1, further comprising:
with a compiler, including instructions into an object code of the producer shader generated by the compiler that causes the producer shader to generate a counter,
wherein the counter is not part of a source code of the producer shader, and
wherein the counter counts the amount of graphics data produced by the producer shader while the producer shader is producing the graphics data.

8. The method of claim 1, wherein counting the amount of the graphics data comprises counting with the producer shader an amount of primitives produced by the producer shader, and
wherein the value indicative of the amount of graphics data comprises the amount of primitives produced by the producer shader at the completion of the production of the graphics data.

9. The method of claim 1, further comprising:
determining how many instances of the one or more consumer shaders to execute based on the value indicative of the amount of graphics data produced by the producer shader,
wherein executing the one or more consumer shaders comprises executing the determined number of instances of the one or more consumer shaders.

10. The method of claim 1, further comprising:
storing a value indicative of a number of a plurality of producer shaders whose graphics data is yet to be consumed, wherein the producer shader is one of the plurality of producer shaders; and
determining which storage locations of the second buffer store values indicative of produced graphics data based on the stored value indicative of the number of the plurality of producer shaders whose graphics data is yet to be consumed.

11. An apparatus comprising:
a first buffer;
a second buffer; and
a graphics processing unit (GPU) configured to:
execute a producer shader that produces graphics data;

store the graphics data produced by the producer shader in a storage location of the first buffer;

during production of the graphics data by the producer shader, count an amount of graphics data that is being produced by the producer shader;

upon completion of the production of the graphics data, store, with the producer shader executing on the GPU, a value indicative of the amount of the graphics data produced by the producer shader in a storage location of the second buffer; and execute one or more consumer shaders to consume the graphics data stored in the storage location of the first buffer based on the value indicative of the amount of graphics data produced by the producer shader and after the producer shader stores the value indicative of the amount of graphics data produced by the producer shader in the storage location of the second buffer.

12. The apparatus of claim 11, wherein the first buffer and the second buffer are part of a common buffer.

13. The apparatus of claim 11, wherein the GPU includes the second buffer.

14. The apparatus of claim 11, wherein, to execute the one or more consumer shaders, the GPU is configured to execute a pixel shader to consume the graphics stored in the storage location of the first buffer.

15. The apparatus of claim 11, wherein the producer shader comprises a first producer shader, wherein the graphics data comprises a first graphics data, wherein the second buffer comprises a first storage location and a second storage location, wherein the value is stored in the first storage location of the second buffer, and wherein the GPU is further configured to:

execute a second producer shader that produces a second graphics data;

store the second graphics data produced by the second producer shader in another, different storage location of the first buffer;

during production of the second graphics data by the second producer shader, count an amount of the second graphics data produced by the second producer shader; and upon completion of the production of the second graphics data, store, with the second producer shader, a value indicative of the amount of the second graphics data produced by the second producer shader in the second storage location of the second buffer.

16. The apparatus of claim 15, wherein the second producer shader completes the production of the second graphics data before the first producer shader completes the production of the first graphics data, and wherein the GPU is further configured to:

not execute the one or more consumer shaders to consume the second graphics data stored in the another, different storage location of the first buffer until the first producer shader completes production of the first graphics data and until the first producer shader stores the value indicative of the amount of graphics data produced by the first producer shader in the first storage location of the second buffer.

17. The apparatus of claim 16, wherein the GPU is further configured to:

execute a first consumer shader of the one or more consumer shaders to consume the first graphics data after the first producer shader stores the value indicative of the amount of graphics data stored in the storage location of the first buffer; and after the execution of the first consumer shader, execute a second consumer shader of the one or more consumer shaders to consume the second graphics data after the second producer shader stores the value indicative of the amount of graphics data stored in the another, different storage location of the first buffer.

18. The apparatus of claim 11, further comprising:

a processor, executing a compiler, configured to compile the producer shader to include instructions into an object code of the producer shader generated by the compiler that causes the producer shader to generate a counter, wherein the counter is not part of a source code of the producer shader, and wherein the counter counts the amount of graphics data produced by the producer shader while the producer shader is producing the graphics data.

19. The apparatus of claim 11, wherein to count the amount of graphics data, the producer shader counts an amount of primitives produced by the producer shader, and wherein the value indicative of the amount of graphics data comprises the amount of primitives produced by the producer shader at the completion of the production of the graphics data.

20. The apparatus of claim 11, wherein the GPU is configured to determine how many instances of the one or more consumer shaders to execute based on the value indicative of the amount of graphics data produced by the producer shader, and wherein, to execute the one or more consumer shaders, the GPU is configured to execute the determined number of instances of the one or more consumer shaders.

21. The apparatus of claim 11, further comprising:

a third buffer configured to store a value indicative of a number of a plurality of producer shaders whose graphics data is yet to be consumed, wherein the producer shader is one of the plurality of producer shaders; and a controller configured to determine which storage locations of the second buffer store values indicative of produced graphics data based on the stored value indicative of the number of plurality of producer shaders whose graphics data is yet to be consumed.

22. The apparatus of claim 11, wherein the apparatus comprises at least one of a media player, a set-top box, a wireless handset, a personal digital assistant (PDA), a desktop computer, a laptop computer, a gaming console, a video conferencing unit, and a tablet computing device.

23. An apparatus comprising:

a first buffer;

a second buffer; and a graphics processing unit (GPU) comprising:

means for executing a producer shader that produces graphics data;

means for storing the graphics data produced by the producer shader in a storage location of the first buffer;

means for counting an amount of the graphics data that is being produced by the producer shader during production of the graphics data by the producer shader;

means for storing, with the producer shader executing on the GPU and upon completion of the production of the graphics data, a value indicative of the amount of the graphics data produced by the producer shader in a storage location of the second buffer; and means for executing one or more consumer shaders to consume the graphics data stored in the storage location of the first buffer based on the value indicative of the amount of graphics data produced by the producer shader and after the value indicative of the amount of graphics data produced by the producer shader is stored in the storage location of the second buffer.

24. The apparatus of claim 23,
wherein the means for executing one or more consumer shaders comprises means for executing a pixel shader to consume the graphics data stored in the storage location of the first buffer.

25. The apparatus of claim 23, wherein the producer shader comprises a first producer shader, wherein the graphics data comprises a first graphics data, wherein the second buffer comprises a first storage location and a second storage location, and wherein the value is stored in the first storage location of the second buffer, the GPU further comprising:
means for executing a second producer shader that produces a second graphics data;
means for storing the second graphics data produced by the second producer shader in another, different storage location of the first buffer;
means for counting an amount of the second graphics data produced by the second producer shader during production of the second graphics data by the second producer shader; and
means for storing, upon completion of the production of the second graphics data, with the second producer shader, a value indicative of the amount of the second graphics data produced by the second producer shader in the second storage location of the second buffer.

26. The apparatus of claim 25, wherein the second producer shader completes the production of the second graphics data before the first producer shader completes the production of the first graphics data, the GPU further comprising:
means for not executing the one or more consumer shaders to consume the second graphics data stored in the another, different storage location of the first buffer until the first producer shader completes production of the first graphics data and until the first producer shader stores the value indicative of the amount of graphics data produced by the first producer shader in the first storage location of the second buffer.

27. The apparatus of claim 26, further comprising:
means for executing a first consumer shader of the one or more consumer shaders to consume the first graphics data after the first producer shader stores the value indicative of the amount of graphics data stored in the storage location of the first buffer; and
after the execution of the first consumer shader, means for executing a second consumer shader of the one or more consumer shaders to consume the second graphics data after the second producer shader stores the value indicative of the amount of graphics data stored in the another, different storage location of the first buffer.

28. The apparatus of claim 23, further comprising:
means for compiling instructions into an object code of the producer shader generated by the compiler that causes the producer shader to generate a counter,
wherein the counter is not part of a source code of the producer shader, and
wherein the counter counts the amount of graphics data produced by the producer shader while the producer shader is producing the graphics data.

29. The apparatus of claim 23, wherein the means for counting the amount of the graphics data comprises means for counting with the producer shader an amount of primitives produced by the producer shader, and
wherein the value indicative of the amount of graphics data comprises the amount of primitives produced by the producer shader at the completion of the production of the graphics data.

30. The apparatus of claim 23, further comprising:
means for determining how many instances of the one or more consumer shaders to execute based on the value indicative of the amount of graphics data produced by the producer shader,
wherein the means for executing the one or more consumer shaders comprises means for executing the determined number of instances of the one or more consumer shaders.

31. The apparatus of claim 23, further comprising:
means for storing a value indicative of a number of a plurality of producer shaders whose graphics data is yet to be consumed, wherein the producer shader is one of the plurality of producer shaders; and
means for determining which storage locations of the second buffer store values indicative of produced graphics data based on the stored value indicative of the number of the plurality of producer shaders whose graphics data is yet to be consumed.

32. The apparatus of claim 23, wherein the apparatus comprises at least one of a media player, a set-top box, a wireless handset, a personal digital assistant (PDA), a desktop computer, a laptop computer, a gaming console, a video conferencing unit, and a tablet computing device.

33. A non-transitory computer-readable storage medium comprising instructions that cause a graphics processing unit (GPU) to:
execute a producer shader that produces graphics data;
store the graphics data produced by the producer shader in a storage location of a first buffer;
during production of the graphics data by the producer shader, count an amount of graphics data that is being produced by the producer shader;
upon completion of the production of the graphics data, store a value indicative of the amount of the graphics data produced by the producer shader in a storage location of a second buffer; and
execute one or more consumer shaders to consume the graphics data stored in the storage location of the first buffer based on the value indicative of the amount of graphics data produced by the producer shader and after the value indicative of the amount of graphics data produced by the producer shader is stored in the storage location of the second buffer.

34. The non-transitory computer-readable storage medium of claim 33, wherein the instructions that cause the GPU to execute the one or more consumer shaders comprise instructions that cause the GPU to execute a pixel shader to consume the graphics data stored in the storage location of the first buffer.

35. The non-transitory computer-readable storage medium of claim 33, wherein the producer shader comprises a first producer shader, wherein the graphics data comprises a first graphics data, wherein the second buffer comprises a first storage location and a second storage location, and wherein the value is stored in the first storage location of the second buffer, the instructions further comprising instructions to cause the GPU to:
execute a second producer shader that produces a second graphics data;

store the second graphics data produced by the second producer shader in another, different storage location of the first buffer;

during production of the second graphics data by the second producer shader, count an amount of the second graphics data produced by the second producer shader; and upon completion of the production of the second graphics data, store, with the second producer shader, a value indicative of the amount of the second graphics data produced by the second producer shader in the second storage location of the second buffer.

36. The non-transitory computer-readable storage medium of claim 35, wherein the second producer shader completes the production of the second graphics data before the first producer shader completes the production of the first graphics data, the instructions further comprising instructions to cause the GPU to:

not execute one or more consumer shaders to consume the second graphics data stored in the another, different storage location of the first buffer until the first producer shader completes production of the first graphics data and until the first producer shader stores the value indicative of the amount of graphics data produced by the first producer shader in the first storage location of the second buffer.

37. The non-transitory computer-readable storage medium of claim 36, further comprising instructions to cause the GPU to:

execute a first consumer shader of the one or more consumer shaders to consume the first graphics data after the first producer shader stores the value indicative of the amount of graphics data stored in the storage location of the first buffer; and after the execution of the first consumer shader, execute a second consumer shader of the one or more consumer shaders to consume the second graphics data after the second producer shader stores the value indicative of the amount of graphics data stored in the another, different storage location of the first buffer.

38. The non-transitory computer-readable storage medium of claim 33, wherein the instructions that cause the GPU to count the amount of graphics data comprise instructions that cause the GPU to count with the producer shader an amount of primitives produced by the producer shader, wherein the value indicative of the amount of graphics data comprises the amount of primitives produced by the producer shader at the completion of the production of the graphics data.

39. The non-transitory computer-readable storage medium of claim 33, further comprising instructions to cause the GPU to:

determine how many instances of the one or more consumer shaders to execute based on the value indicative of the amount of graphics data produced by the producer shader, wherein the instructions to execute the one or more consumer shaders comprise instructions to execute the determined number of instances of the one or more consumer shaders.

40. The non-transitory computer-readable storage medium of claim 33, further comprising instructions to cause the GPU to:

store a value indicative of a number of a plurality of producer shaders whose graphics data is yet to be consumed, wherein the producer shader is one of the plurality of producer shaders; and determine which storage locations of the second buffer store values indicative of produced graphics data based on the stored value indicative of the number of the plurality of producer shaders whose graphics data is yet to be consumed.

* * * * *